(12) United States Patent
Dalton et al.

(10) Patent No.: US 12,116,131 B2
(45) Date of Patent: Oct. 15, 2024

(54) SYSTEMS AND METHODS FOR EJECTING BATTERIES FROM AN ELECTRIC FLYING VEHICLE

(71) Applicants: Daniel Dalton, Tahoe City, CA (US); Elizabeth Dalton, Tahoe City, CA (US)

(72) Inventors: Daniel Dalton, Tahoe City, CA (US); Elizabeth Dalton, Tahoe City, CA (US)

(*) Notice: Subject to any disclaimer, the term of this patent is extended or adjusted under 35 U.S.C. 154(b) by 181 days.

(21) Appl. No.: 17/233,286

(22) Filed: Apr. 16, 2021

(65) Prior Publication Data

US 2021/0323670 A1 Oct. 21, 2021

Related U.S. Application Data

(60) Provisional application No. 63/011,102, filed on Apr. 16, 2020.

(51) Int. Cl.
| | |
|---|---|
| *B64D 1/02* | (2006.01) |
| *B64D 9/00* | (2006.01) |
| *B64D 27/24* | (2024.01) |
| *H01M 10/42* | (2006.01) |
| *H01M 10/48* | (2006.01) |
| *H01M 50/202* | (2021.01) |
| *H01M 50/244* | (2021.01) |

(Continued)

(52) U.S. Cl.
CPC ............... *B64D 1/02* (2013.01); *B64D 27/24* (2013.01); *H01M 10/425* (2013.01); *H01M 10/482* (2013.01); *H01M 10/486* (2013.01); *H01M 50/244* (2021.01); *H01M 50/249* (2021.01); *H01M 50/262* (2021.01); *H01M 50/502* (2021.01); *H01M 2200/00* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 11,408,374 B1 * | 8/2022 | Beck | H01M 50/244 |
| 2004/0157117 A1 * | 8/2004 | Tamaki | H01M 50/50 |
| | | | 429/100 |

(Continued)

FOREIGN PATENT DOCUMENTS

| | | |
|---|---|---|
| DE | 102019201517 | 8/2020 |
| WO | WO2019241581 | 12/2019 |

*Primary Examiner* — Ula C Ruddock
*Assistant Examiner* — Mary Grace Byram
(74) *Attorney, Agent, or Firm* — Lowry Blixseth APC; Scott M. Lowry

(57) ABSTRACT

One method for ejecting a battery from an electric flying vehicle includes monitoring one or more batteries providing power to the electric flying vehicle during a flight, determining when at least one of those batteries is operating as a hazardous battery posing a safety risk to the electric flying vehicle while in flight, activating an ejection system disconnecting the hazardous battery from a chassis of the electric flying vehicle, and ejecting the hazardous battery from the electric flying vehicle during the flight. The system operating this process may include a sensor that monitors the operating state of the batteries, a controller in communication with the sensor for determining when the one or more of the batteries is hazardous, and an actuator opening enough of the housing to permit ejection of the hazardous battery out from within the electric flying vehicle midflight.

8 Claims, 6 Drawing Sheets

(51) Int. Cl.
*H01M 50/249* (2021.01)
*H01M 50/262* (2021.01)
*H01M 50/502* (2021.01)

(56) References Cited

U.S. PATENT DOCUMENTS

| | | |
|---|---|---|
| 2014/0339371 A1 | 11/2014 | Yates |
| 2016/0009392 A1 | 1/2016 | Korhonen |
| 2017/0144562 A1 | 5/2017 | Thomas |
| 2018/0093768 A1 | 4/2018 | Castleman |

\* cited by examiner

SYSTEMS AND METHODS FOR EJECTING BATTERIES FROM AN ELECTRIC FLYING VEHICLE

BACKGROUND OF THE INVENTION

The present invention generally relates to systems and methods for safely ejecting batteries from an electric flying vehicle, such as during a midflight emergency. More specifically, the present invention relates to systems and methods for determining when a battery of an electric flying vehicle has become hazardous, activating a battery ejection system, ejecting the hazardous battery from the electric flying vehicle midflight, and then deploying a parachute to ensure safe landing of the ejected battery on the ground.

Airplanes, like most vehicles, must necessarily carry an energy source onboard to operate. Principally, the energy source powers an engine capable of generating enough thrust for the aircraft to take off and maintain flight until reaching a desired destination. As such, the energy source must contain enough fuel to operate the engine during take-off, midflight, and landing, as well as any fuel reserves. In this respect, most commercial airliners and some private jets utilize some form of jet engine design that essentially generates thrust by increasing pressure inside the engine (e.g., by combusting fossil fuels therein and/or a compressor), and then releasing the high pressure gasses through an outlet at the rear of the engine. The pressure differential between the inlet and outlet generates the desired thrust.

Other types of airplane engines include piston-based engines that burn fossil fuels to drive a crankcase. Here, the piston-based engine does not produce thrust on its own. Rather, power provided to the crankcase drives a spinning propeller. The propeller produces thrust by creating a pressure difference between the front and back of the spinning blades, thereby resulting in a forward force. Although, engines that generate thrust by burning fossil fuels can be expensive and produce gas byproducts such as carbon dioxide, which may be harmful to the environment. Moreover, engines that rely on combustion can also be relatively noisy, and may require frequent maintenance to ensure proper operation of the combustion chamber and moving components.

With advances in battery storage capacity, weight, and overall efficiency, electric flying vehicles are becoming more common as a more cost effective, quieter, and eco-friendly alternative to traditional gas-based airplane engines. Some electric flying vehicle designs provide power to a motor that drives a spinning propeller, similar to piston-based engine designs. Of course, the batteries serve as the primary energy source and must provide enough power to start up the propellers and maintain spinning midflight to ensure the thrust generated by the pressure differential between the front and back of the propeller blades remains sufficient to keep the electric flying vehicle airborne until reaching its destination. In this respect, onboard batteries essentially replace fossil fuels as the primary energy source for powering the propeller blades. Although, given that battery technology used in connection with electric flying vehicles is fairly new and underdeveloped, there are no known safety mechanisms for monitoring, determining if and/or when a battery may have become hazardous (especially, e.g., midflight), and then safely and efficiently removing the hazardous battery(s) from the electric flying vehicle should a problem threaten the safety or structural integrity of the airplane midflight (e.g., during a fire or the like). Such safety mechanisms may be particularly important for manned electric flying vehicles.

As such, there exists, therefore, a significant need for systems and methods for monitoring the health of electric flying vehicle batteries in real-time, determining if and/when one or more of the batteries may have entered an unsafe state, and then safely and efficiently managing the ejection of the hazardous batteries out from the electric flying vehicle midflight. Such a system may include one or more battery sensors for monitoring the health of the batteries, a central controller for determining when one or more of the onboard batteries may cause damage to the electric flying vehicle, and then ejecting the hazardous batteries out from a cargo door or other ejection door midflight, while also ensuring safe deployment and landing of the ejected batteries through use of a parachute or the like. The present invention fulfills these needs and provides further related advantages.

SUMMARY OF THE INVENTION

In one embodiment, the method for safely ejecting batteries from an electric flying vehicle midflight may include steps such as monitoring the health of one or more onboard batteries in real-time, determining when at least one battery is in a hazardous condition, activating a system for safely ejecting the at least one hazardous battery from the electric flying vehicle midflight, such as by way of de-coupling the affected battery, unlocking the battery compartment, and ejecting the hazardous battery out a rear cargo door or other ejection door, and deploying a parachute coupled with the ejected battery to safely land the parachuted ejected battery on the ground.

In another embodiment, a method for ejecting a battery from an electric flying vehicle may include monitoring one or more batteries providing power to the electric flying vehicle during a flight, determining when at least one of the one or more batteries providing power to the electric flying vehicle is operating as a hazardous battery posing a safety risk to the electric flying vehicle while in flight, activating an ejection system disconnecting the hazardous battery from a chassis of the electric flying vehicle, and ejecting the hazardous battery from the electric flying vehicle during the flight. In this respect, the activating step may further include de-coupling the hazardous battery from a bus interface (e.g., a quick-release cable), whereby the hazardous battery may be ejected by way of opening a cargo door within the fuselage, wing, or engine compartment of the electric flying vehicle. This may at least allow the ejecting step to drop the hazardous battery from the fuselage, the wing, or one or more externally mounted engine compartments.

In another aspect of these embodiments, the method may include a step for deploying a landing system coupled with the ejected hazardous battery to soften its landing on the ground. Here, the deploying step may include monitoring an altitude of the ejected hazardous battery with an altimeter to ensure the hazardous battery has dropped far enough from the electric flying vehicle before deploying the landing system, which may include a parachute. Alternatively, or in addition to, the method may include comparing a geographic location of the ejected hazardous battery to a geographic location of the electric flying vehicle, and then performing the deploying step after the ejected hazardous battery is a predetermined distance away from the electric flying vehicle. In this respect, the method may also time activation of the deploying step as a factor of when the hazardous battery was ejected from the electric flying vehicle. The timer may be initiated by tripping a mechanical clock during the course of the hazardous battery being ejected from the electric flying vehicle, or starting electronically after the ejected hazardous battery loses connectivity (e.g., wireless or otherwise) with the electric flying vehicle.

Moreover, the monitoring step may include sensing an operating state of each of the one or more batteries with one or more sensors (e.g., a smoke sensor, a fire sensor, a light sensor, a heat sensor, or a stress-strain sensor) and communicating the operating state of each of the one or more batteries to a central controller for comparison to a set of predetermined safe operating conditions. If any of the sensors transmit data falling outside the set of predetermined safe operating conditions, the central controller may identify which battery is operating in a hazardous state, and prepare to eject the same to ensure the safety of the electric flying vehicle. To the extent the electric flying vehicle is manned, the operating state for each of the batteries may be communicated to a human interface device (e.g., an LCD or comparable screen) in real-time.

The activating step may further include unlocking a battery compartment housing the hazardous battery from a set of ejection rails at least partially coupled to the chassis of the electric flying vehicle. Then, the unlocked battery compartment may be rolled out from a fuselage of the electric flying vehicle along the set of ejection rails. In an alternative embodiment, the set of ejection rails may be reoriented by approximately 90 degrees, so the unlocked battery compartment housing the hazardous battery may laterally roll out from a side hatch of the electric flying vehicle. Moreover, the ejecting step may include triggering a spring, a propellant, a controlled explosive, or a hydraulic actuator propelling the hazardous battery out from within the electric flying vehicle. In another aspect of these embodiments, the method may automatically adjust at least one flight parameter of the electric flying vehicle in real-time while simultaneously ejecting the hazardous battery to maintain a flight trajectory of the electric flying vehicle.

In another aspect of the embodiments disclosed herein, a battery ejection system for an electric flying vehicle may include a housing containing one or more batteries that provide power to the electric flying vehicle, a sensor (e.g., a smoke sensor, a fire sensor, a light sensor, a heat sensor, or a stress-strain sensor) for monitoring an operating state of each of the one or more batteries within the housing of the electric flying vehicle, a controller in communication with the sensor for determining when the operating state of at least one of the one or more batteries is as a hazardous battery posing a safety risk to the electric flying vehicle, based on information received from the sensor, and an actuator opening enough of the housing to permit ejection of the hazardous battery out from within the electric flying vehicle midflight.

In one embodiment, the controller may couple to the sensor and a bus interface connected to at least one of the one or more batteries, about a wired communication line or wireless interface. Each of the batteries may be stored within a battery compartment coupled to a set of ejection rails. In this embodiment, a lock may retain each of the battery compartments to the set of ejection rails, thereby reducing relative movement of the one or more batteries within the housing during a flight. Moreover, the battery compartment may include a parachute, a speed brake, or a decelerator coupled thereto and positioned to deploy after the battery compartment ejects out from within the electric flying vehicle. The parachute may be coupled with the ejected hazardous battery and include a telemetry transceiver for later geo-locating the ejected hazardous battery.

In another aspect of these embodiments, the housing may include a set of upstanding vertical guide rails generally positioned to constrain forward, rearward, and side-to-side movement of each battery compartment within the electric flying vehicle. The housing may be a fuselage, a wing, or an external engine chamber of the electric flying vehicle. In this embodiment, a rear cargo door, a side hatch, or a bottom-mounted ejection door may be formed from a portion of the fuselage, each of which may have a size and shape to permit select ejection of the hazardous battery out from within the electric flying vehicle. An accelerator that includes a spring, a propellant, a controlled explosive, or a hydraulic armature coupled to each of the one or more batteries may assist to more quickly eject the respective hazardous battery out from within the electric flying vehicle.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
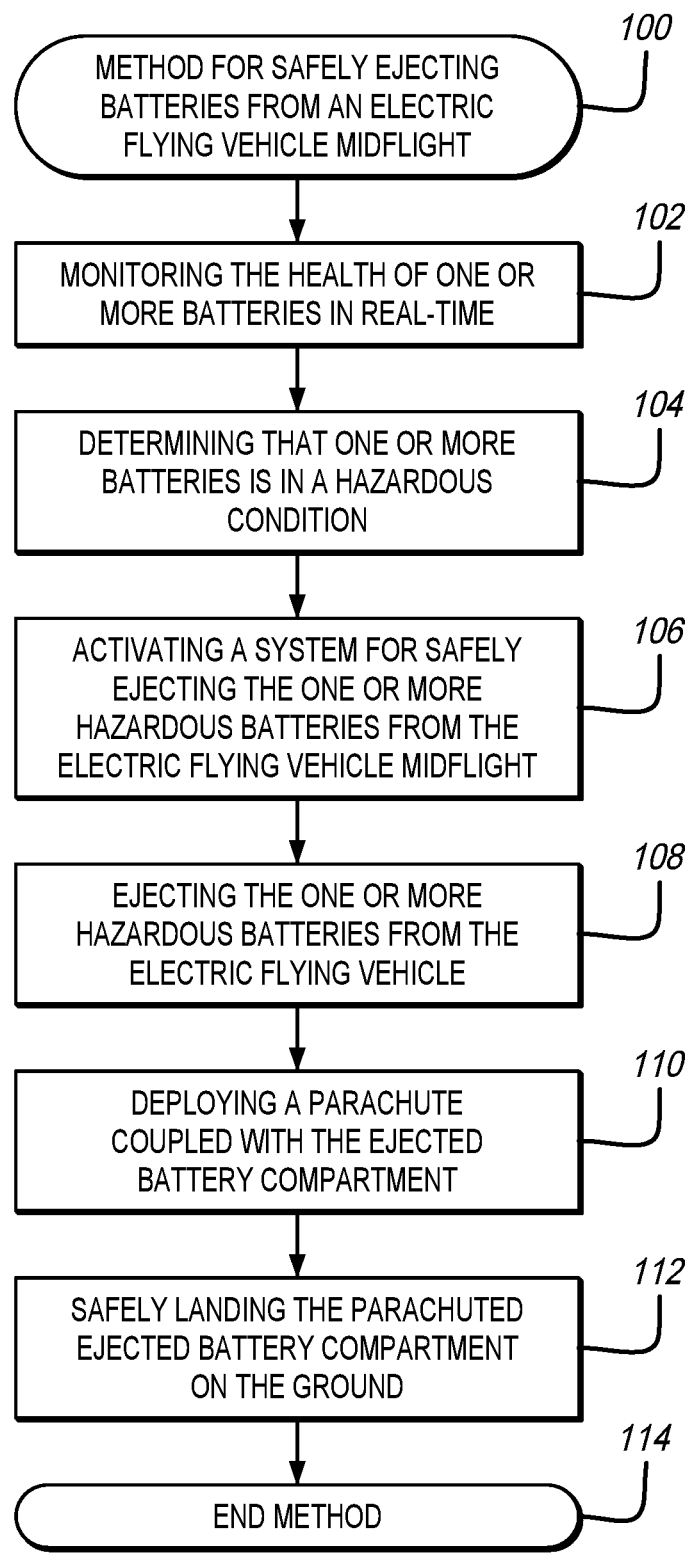
FIG. 1 is a flowchart illustrating a process for safely ejecting batteries from an electric aircraft during a midflight emergency.

As shown in the exemplary drawings for purposes of illustration, the present invention for a method for safely ejecting batteries from an electric flying vehicle midflight (100) is generally illustrated with respect to the flowchart shown in FIG. 1, and FIGS. 2-4 and 6-11 illustrate various embodiments of an electric flying vehicle 20, 20', 20", 20"' incorporating an emergency response system for carrying out the aforementioned method (100). In general, the method (100) disclosed herein may provide a fast (e.g., real-time) and efficient way to mitigate the loss of life and/or property (e.g., both on-board the electric flying vehicle 20, 20', 20", 20"' and/or on the ground below) in response to an on-board emergency (e.g., a fire) related to the use and/or operation of one or more batteries carried by the electric flying vehicle 20, 20', 20", 20"' as a power source to operate one or more engines used in connection therewith. In this respect, in the event of such an on-board emergency, the method (100) may utilize a series of sensors, controllers, processing units, and/or system mechanics to quickly and safely assist in ejecting one or more hazardous or damaged batteries out from within the electric flying vehicle 20, 20', 20", 20"'. Such methods (100) are designed to preserve the safety and structural integrity of the electric flying vehicle 20, 20', 20", 20"' midflight until it can land, while, at the same time, being designed to safely deploy the one or more damaged batteries to the ground, especially since the methods (100) disclosed herein are designed to eject damaged and/or hazardous batteries midflight. The electric flying vehicle disclosed herein, including the electric flying vehicles 20, 20', 20", 20"', may include aircraft, airplanes, roto-craft, etc.

More specifically, one aspect of the method (100) is the step of monitoring the health of the batteries within the electric flying vehicle 20, 20', 20", 20"' in real-time (102). In this respect, as illustrated, e.g., in the cross-sectional views of FIGS. 4 and 6, the electric flying vehicle 20, 20' may include a sensor 22 that couples about a communication line 24 to a bus interface 26 adjacent one or more battery compartments 28, each housing and/or retaining one or more batteries 30 therein. The sensor 22 may also couple to a system central controller 29 as illustrated, e.g., with respect to the electric flying vehicles 20", 20"' in FIGS. 9-11. Here, the central controller 29 may receive and/or interpret signals generated by one or more of the sensors 22 to determine whether one or more of the batteries 30 should be ejected to improve safety. The central controller 29 may make safety decisions in real-time and communicate and/or operate the other systems such as one or more emergency ejection sensor data processors and/or human interface devices that may provide human readable status information (e.g., on an LCD screen or the like) and/or controls for manually operating the equipment disclosed herein simultaneously in real-time. For example, the central controller 29 may send and/or receive information with the sensors 22 along the communication line 24, and then selectively de-couple and disconnect the affected batteries from the bus interface 26 (e.g., by a cable quick-release or other quick-release hardware known in the art) in real-time as needed and/or desired during an emergency. Of course, the sensors 22, the communication lines 24, the bus interface 26, and/or the central controller 29 may be wired and/or located with other known electrical equipment or wiring within a body 32 of any of the electric flying vehicles 20, 20', 20", 20"'. The sensors 22 should be positioned somewhat proximate the batteries 30, such as within a fuselage 34 as illustrated best in FIGS. 4 and 6 with respect to the electric flying vehicles 20, 20', within one or both of a pair of wings 36 as illustrated best in FIG. 9 with respect to the electric flying vehicle 20", or within one or multiple of a set of engine housings 38 as best illustrated in FIG. 10 with respect to the electric flying vehicle 20"'. The sensor 22 may include one or more sensors designed to monitor battery health, such as a smoke sensor, a fire sensor, a light sensor, a heat sensor, a stress/strain sensor, or another mechanical or chemical sensor known in the art.

Figure 2:
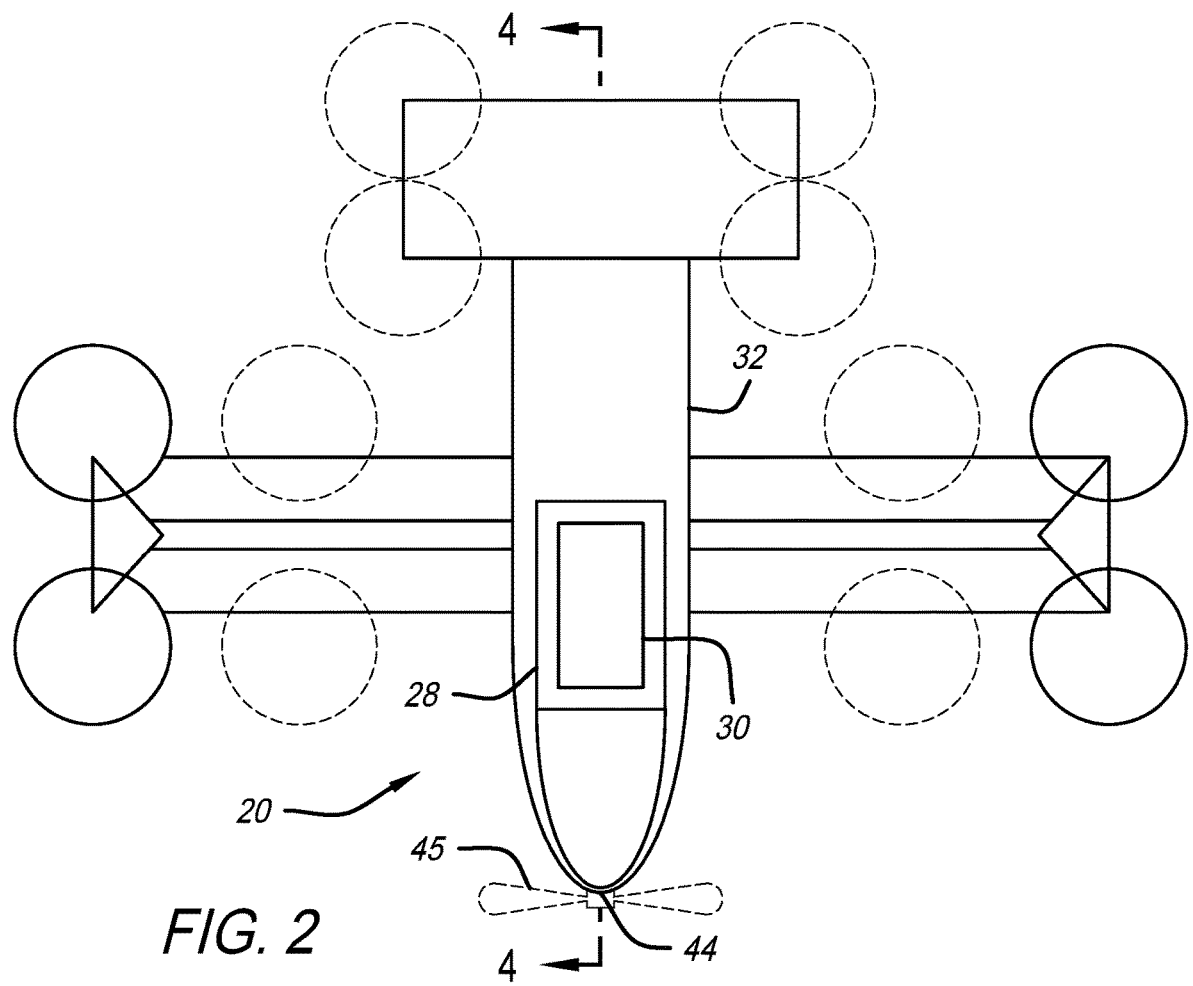
FIG. 2 is a top plan view of one embodiment of an electric flying vehicle carrying batteries within a battery compartment in a fuselage of the electric flying vehicle.
Figure 3:
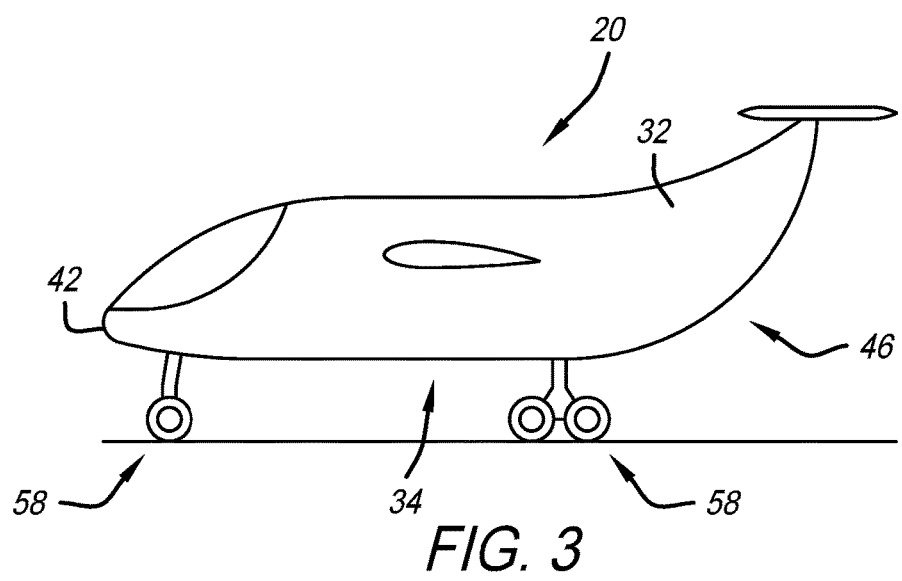
FIG. 3 is a side view of the electric flying vehicle of FIG. 2.
Figure 4:
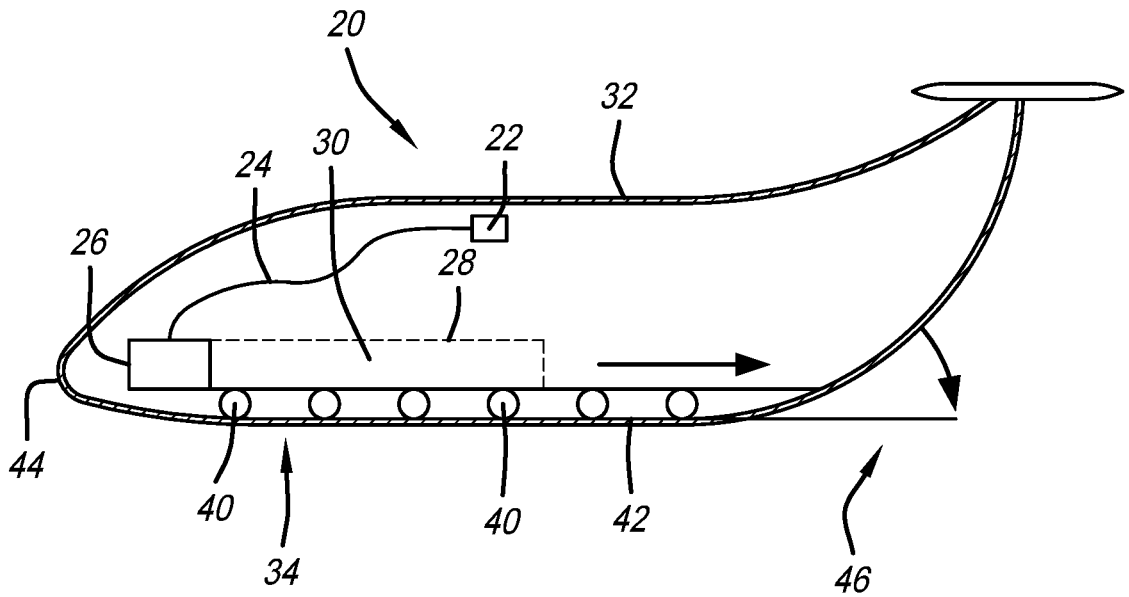
FIG. 4 is a cross-sectional view of the electric flying vehicle of FIGS. 2 and 3, taken about the line 4-4 in FIG. 2, and more specifically illustrating a rear cargo door ejection system.

Specifically with respect to FIGS. 2-4, the battery compartment 28 retaining one or more of the batteries 30 therein may be located within the fuselage 34 of the electric flying vehicle 20. In this embodiment, the battery compartment 28 is illustrated resting on a set of ejection rails 40 located on a base 42 of the fuselage 34. During normal flight operation, the batteries 30 in the battery compartment 28 remain coupled with the bus interface 26 positioned proximate a nose 44 of the electric plane 20. Here, the batteries 30 may serve as fuel for delivering electricity to drive one or more engines that operate a propeller 45 (FIGS. 2, 8, and 10) to maintain the electric flying vehicle 20 in flight. Moreover, the battery compartment 28 may also be locked relative to the set of ejection rails 40 in the position generally illustrated in FIG. 4 to substantially reduce (and possibly eliminate) relative movement of the batteries 30 therein during flight.

Although, in the event one or more of the sensors 22 determines that one or more of the batteries 30 is in a hazardous condition as part of step (104), the sensor 22 may relay a signal to de-couple the bus interface 26 from the damaged or hazardous batteries 30. Moreover, the battery compartment 28 housing the damaged or hazardous batteries may be unlocked as part of a step (106) for safely ejecting the one or more hazardous batteries from the electric flying vehicle 20 midflight. At the same time, the central controller 29 may open the fuselage 34, such as by moving a rear cargo door 46 from a closed position as illustrated in FIG. 3 to an open position as illustrated in FIG. 4. When in the open position illustrated in FIG. 4, the now unlocked battery compartment 28 housing the damaged and/or hazardous batteries may be able to slide or roll rearward within the fuselage 34 along the ejection rails 40, such as by way of gravity. Although, additional mechanisms such as springs, propellants, explosives, or mechanical apparatus (e.g., armatures operated by hydraulics) may be used to more quickly eject the battery compartment 28 from the electric flying vehicle 20 once the rear cargo door 46 is deployed to the open position illustrated in FIG. 4. Such ejection may occur as part of step (108).

Figure 5:
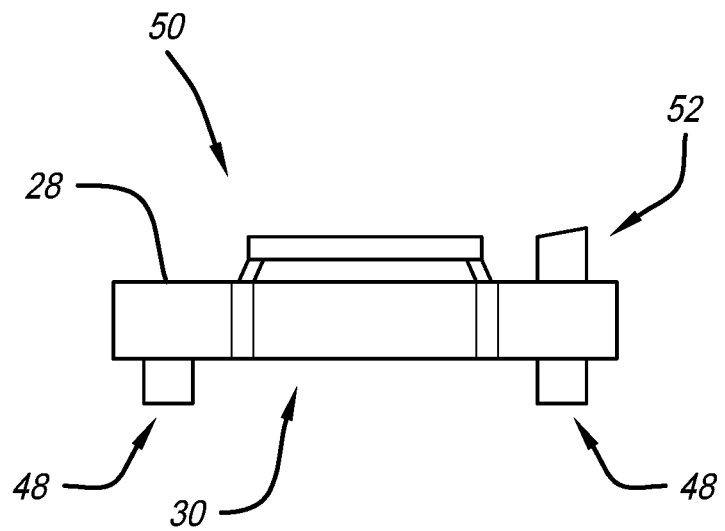
FIG. 5 is an front elevation view of a battery compartment for use with the electric flying vehicles disclosed herein.

FIG. 5 is a rear plan view of the battery compartment 28 having a pair of opposing feet 48 that allow the battery compartment 28 to traverse over the ejection rails 40 and out through the rear cargo door 44 of the electric flying vehicle 20 as part of step (108). FIG. 5 also illustrates that at least one of the batteries 30 may be mounted within the frame of the battery compartment 28. Furthermore, a parachute 50 or another speed safety mechanism (e.g., speed brakes, decelerators, etc.) may couple to the battery compartment 28 in a position (e.g., as illustrated in FIG. 5) to deploy after the battery compartment 28 ejects out from the fuselage 34. The parachute 50 may assist in preserving safe deployment by decelerating the rate at which the damaged ejected batteries descend to the ground. In some embodiments, the parachute 50 may include a more traditional canopy structure (e.g., including a vent and/or pilot chute). Moreover, the parachute 50 may also be integrated with one or more balloons and/or cushions that selectively inflate upon ejection, at some point midflight, or when nearing the ground, to assist in deceleration during freefall and to assist in softening impact when the ejected batteries reach the ground.

Moreover, a parachute control module 52 mounted to the battery compartment 28 may collect data to determine when it is safe to deploy the parachute 50, as part of the deployment step (110). Here, the parachute control module 52 may include its own sensor such as an altimeter that determines the altitude of the ejected battery compartment 28 in real-time before it lands on the ground. Although, of course, the parachute control module 52 may include one or more other sensors and/or controls to determine the status of the parachute 50 (e.g., unarmed, armed, deployed, failure, etc.) and/or the status of the ejected battery compartment 28 (e.g., acceleration, altitude, speed, etc.), such as an integral or separately located parachute telemetry transceiver (e.g., an Emergency Locator Transceiver (ELT)) that relays a signal related to the location, status, etc. of the parachute 50 to a third party receiver (e.g., one or more recovery teams). Moreover, the parachute control module 52 may also include a clock that delays deployment of the parachute 50 based on some predetermined duration after the ejected battery compartment 28 loses contact with the electric flying vehicle 20 (e.g., once ejected out the back of the open rear cargo door 46). In one embodiment, the clock may be mechanically tripped on the way out the rear cargo door 46. In another embodiment, the clock may be electronically tripped, such as by way of losing wireless connection with an onboard receiver and/or transmitter coupled to the central controller 29. To this end, after deployment as part of step (110), the parachute 50 deploys at a desired altitude and speed to ensure the ejected battery compartment 28 safely lands on the ground as part of step (112). In an upright landing, the battery compartment 28 would land resting on the feet 48. Of course, deploying the parachute 50 during this process helps soften the landing of the battery compartment 28, which may otherwise be relatively heavy if it were to hit the ground on freefall. At this point, the method (100) ends as part of step (114) when the battery compartment 28 safely lands on the ground.

The electric flying vehicle 20 may continue to derive energy from one or more batteries that remain within the fuselage 38 and/or other energy sources (e.g., a back-up generator or some other fuel reserve), to keep the propeller blades running long enough so the electric flying vehicle 20 has enough fuel to make an emergency landing nearby.

Figure 6:
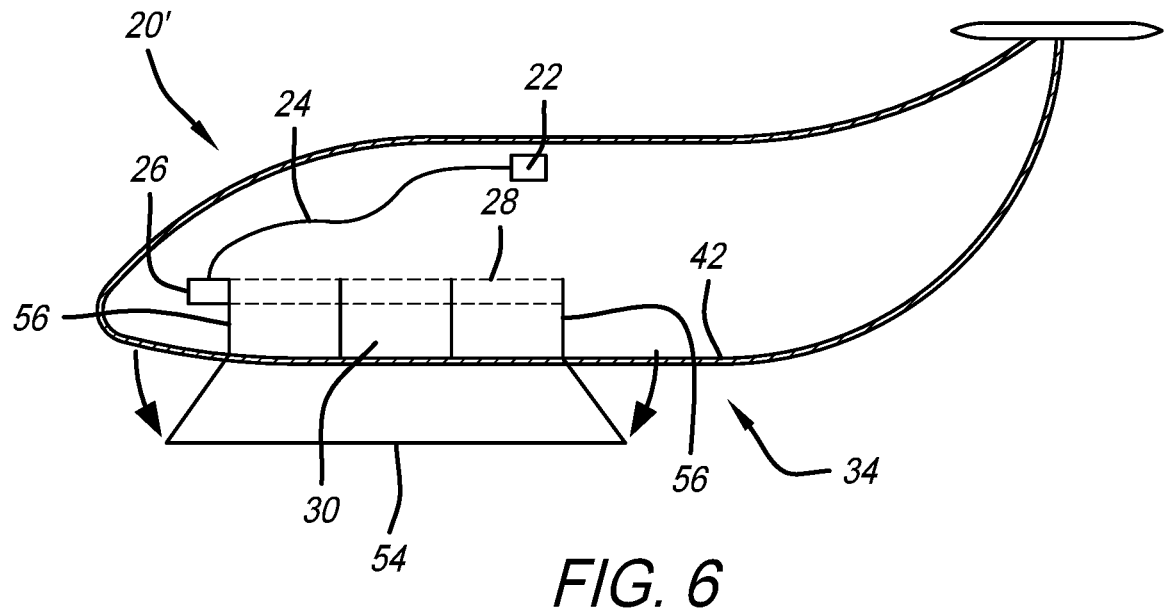
FIG. 6 is a cross-sectional view similar to FIG. 4, further illustrating a under carriage ejection door in an alternative electric flying vehicle.
Figure 7:
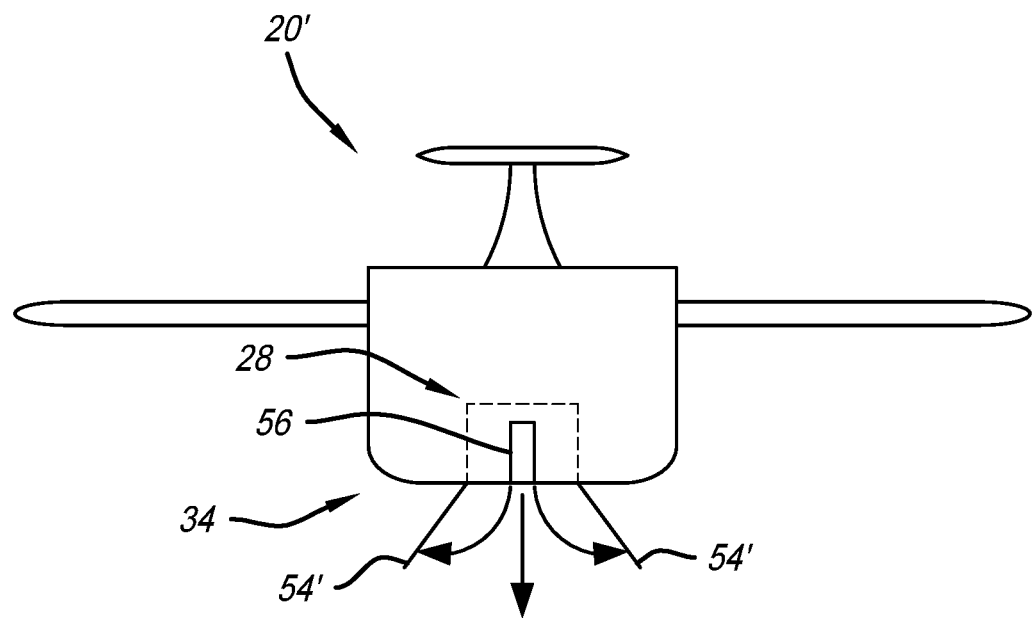
FIG. 7 is a rear elevation view of the alternative electric flying vehicle of FIG. 6, further illustrating a battery compartment positioned immediately above a pair of under carriage ejection doors.

In an alternative embodiment, the electric flying vehicle 20' may include at least one ejection door 54 built into a bottom portion of the fuselage 34 as illustrated, e.g., in FIGS. 6 and 7. Here, during the monitoring step (102), when the sensor 22 determines that at least one battery compartment 28 needs to be ejected from the electric flying vehicle 20' as part of step (104), the bus interface 26 may again de-couple from the affected batteries 30 and the battery compartment 28 may unlock from being coupled to the fuselage 34. At the same time, the central controller 29 may simultaneously open one or more of the ejection doors 54, as part of the step for safely ejecting the one or more hazardous batteries from the electric flying vehicle 20' midflight (106). Here, FIG. 6 illustrates that the electric flying vehicle 20' may include one of the ejection doors 54 while FIG. 7 illustrates another embodiment wherein the electric flying vehicle 20' could have a pair of opposing ejection doors 54' built into the fuselage 34. A pair of vertical guide rails 56 upstanding from the base 42 of the fuselage 34 may generally constrain forward/rearward and/or side-to-side movement of the battery compartment 28 within the fuselage 34. In this respect, the vertical guide rails 56 may maintain the position of the battery compartment 28 above the one or more ejection doors 54, 54'. As such, once the one or more ejection doors 54, 54' open, the now unlocked battery compartment 28 located thereabove may effectively drop out from within the electric flying vehicle 20' as part of step (108). The method for then deploying the parachute 50 coupled to the ejected battery compartment 28 in step (110) and then safely landing the ejected battery component 28 on the ground as part of (112) is similar to that disclosed above with respect to FIGS. 2-5.

The rear cargo door 46 and/or the one or more ejection doors 54, 54' may be operated mechanically to eject the battery compartment 28 therefrom, or ejection may be aided by way of propellants, hydraulics, springs, explosives, or may simply operate by gravity as disclosed above.

Figure 8:
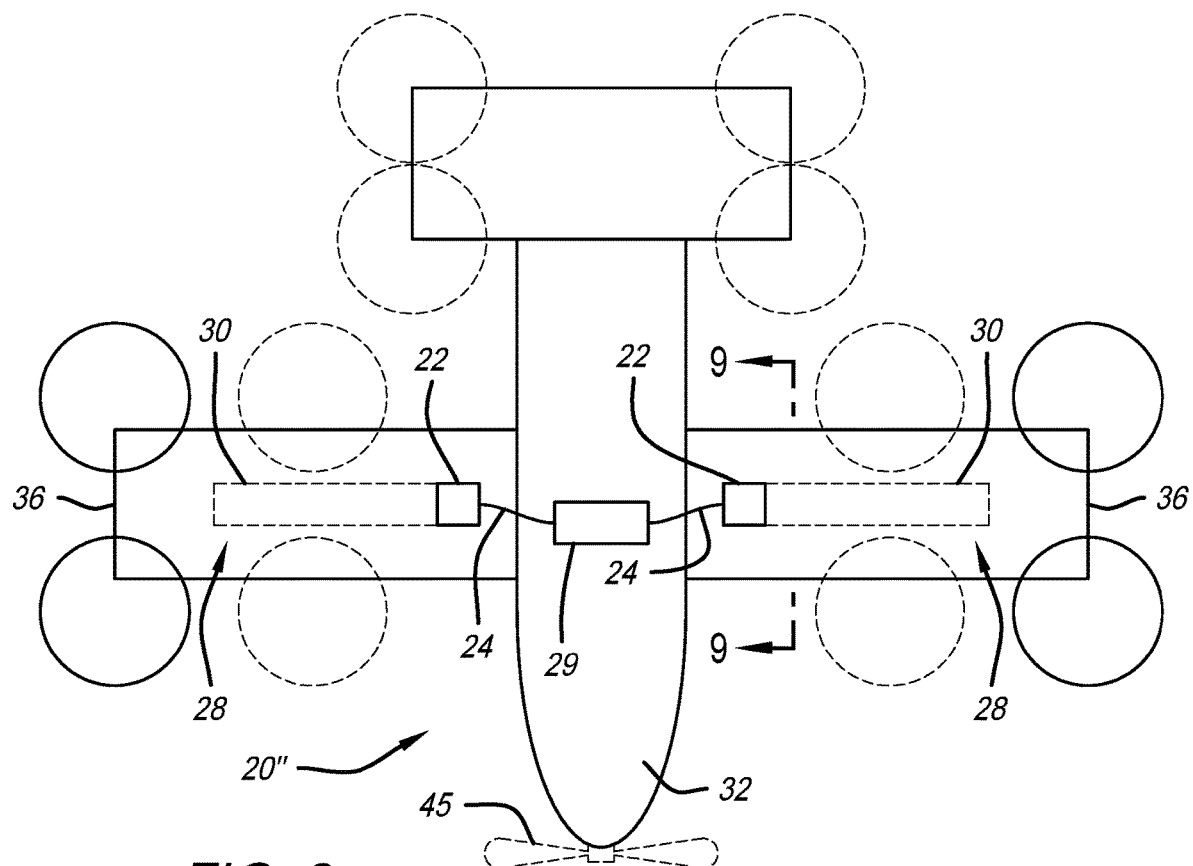
FIG. 8 is a top plan view of another alternative electric flying vehicle incorporating a pair of wing-mounted battery compartments.
Figure 9:
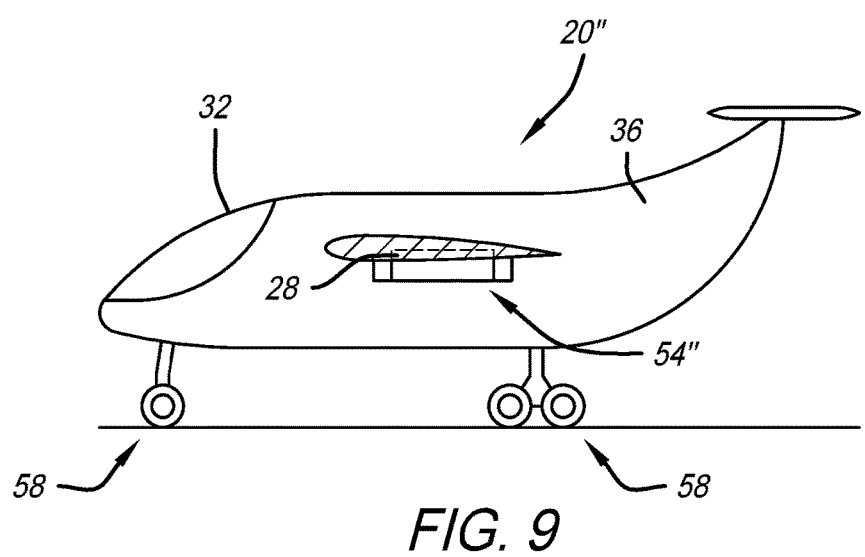
FIG. 9 is a cross-sectional view taken about the line 9-9 in FIG. 8, further illustrating the internal structure of one of the wing-mounted battery compartments.
Figure 10:
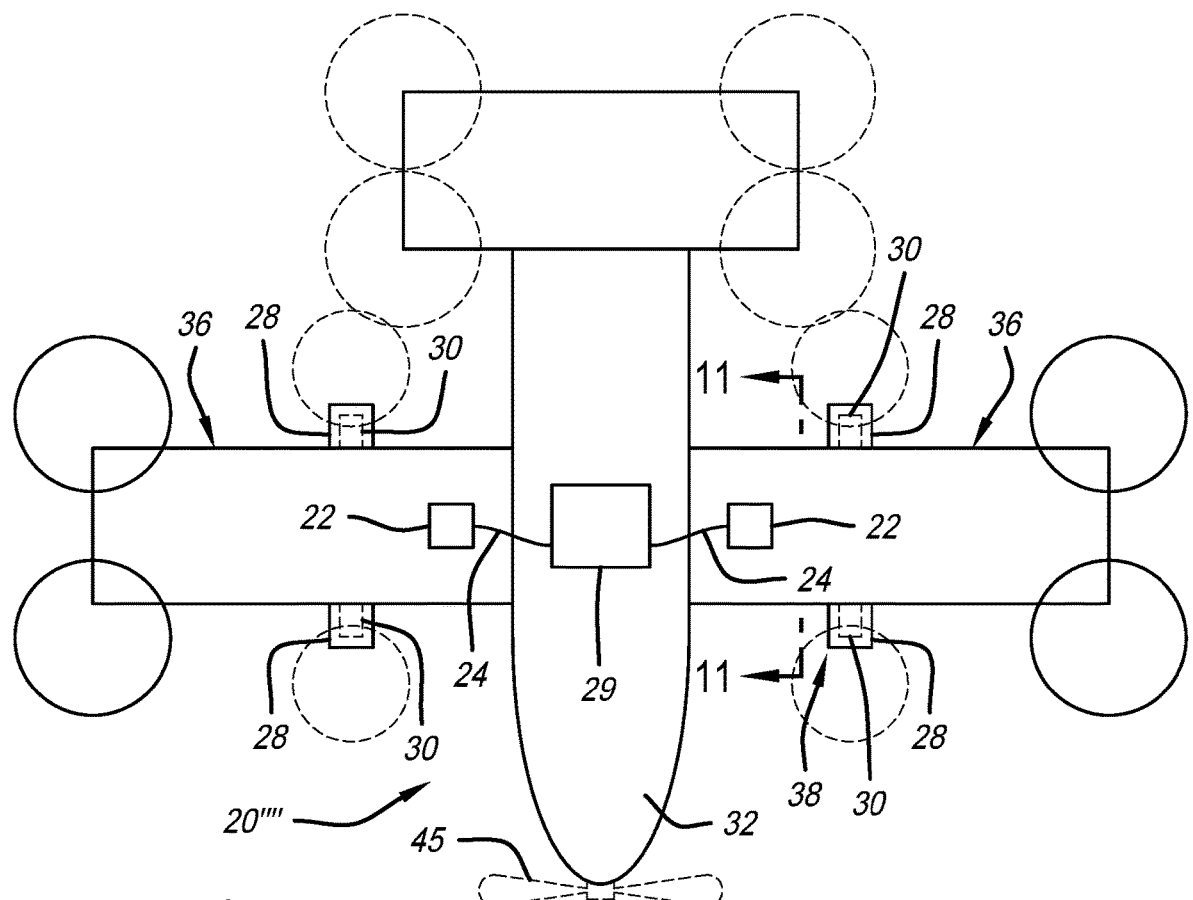
FIG. 10 is a top plan view of another alternative electric flying vehicle incorporating an engine-mounted battery compartment.

FIGS. 8-9 illustrate another alternative embodiment of the electric flying vehicle 20" wherein the one or more battery compartments 28 housing the one or more batteries 30 reside within the pair of wings 36, as opposed to residing within the fuselage 34, as disclosed herein with respect to FIGS. 2-4 and 6-7. In this embodiment, the central controller 29 may couple with any of the sensors 22 (e.g., by the communication line 24 or wirelessly) and/or the bus interface 26 (not shown in FIG. 8) along the body 32 of the electric flying vehicle 20", e.g., along with other electrical wiring and/or electrical components as may be known in the art. Although, the one or more sensors 22 should still be located proximate the batteries 30 within each of the wings 36 so that the one or more sensors 22 can monitor the health of the batteries 30 in real-time, and especially midflight. The wings 36 may include an integral ejection door 54", similar to the embodiments disclosed above with respect to the ejection doors 54, 54' illustrated with respect to FIGS. 6-7. In this respect, when the central controller 29 determines that one or more of the batteries 30 are in a hazardous condition as part of step (104), the central controller 29 may begin to safely eject the one or more hazardous batteries 30 from the electric flying vehicle 20" as part of step (106) by first de-coupling the affected batteries 30 from the bus interface 26 and unlocking the respective battery compartment 28 retaining the affected batteries 30. At the same time, the respective ejection door(s) 54" in the wing 36 of the affected battery 30 may move from a normal closed position as illustrated in FIG. 8 to an emergency ejection open position as illustrated in FIG. 9. Once open, the one or more hazardous batteries 30 may be ejected from the respective wing 36 of the electric flying vehicle 20" as part of step (108), such as by way of simply dropping the affected battery compartment 28 out from within the respective wing 36 by gravity now that the ejection door 54" is open. The process for deploying the parachute 50 of the ejected battery compartment 28 as part of step (110) and then safely landing the parachuted ejected battery compartment 28 on the ground as part of step (112), to end the process (114), is substantially the similar to that disclosed above with respect to FIGS. 2-5.

In an alternative embodiment, the ejection doors 54" illustrated in FIG. 9 may be replaced with pylons, booms, or other mechanical apparatus that sufficiently retain, and if needed, release the battery compartment 28 from the respective wing 36 in the event that one or more of the associated batteries 30 retained thereby become hazardous to the continued safe operation of the electric flying vehicle 20".

Figure 11:
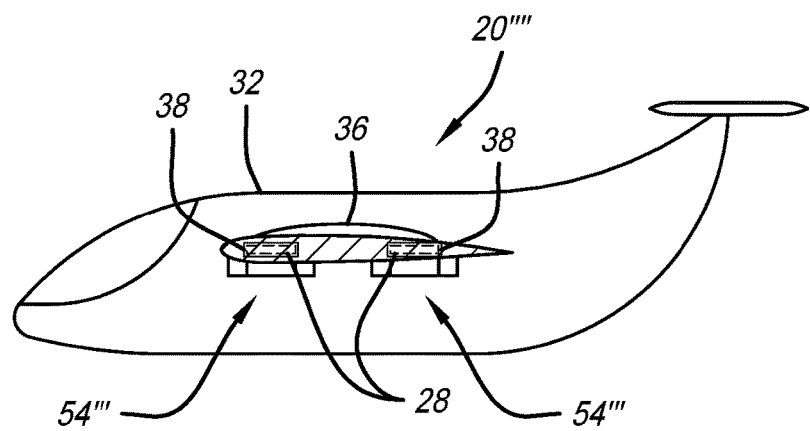
FIG. 11 is a cross-sectional view taken about the line 11-11 in FIG. 10, further illustrating the internal structure of the engine-mounted battery compartment.

FIGS. 10 and 11 illustrate another alternative embodiment of the electric flying vehicle 20'" wherein the battery compartments 28 housing the batteries 30 reside within the set of engine housings 38 illustrated therein. In this respect, as generally discussed above, each of the engine housings 38 may include one or more of the sensors 22 (generally illustrated in FIG. 10) for monitoring the health of the one or more batteries 30 as part of step (102). FIG. 9 illustrates that the one or more sensors 22 may couple to the central controller 29 by way of the communication line 24, but the sensors 22 may also communicate therewith wirelessly. Similarly, the central controller 29 may communicate (e.g., by way of a wire line or wireless connection) to the bus interface 26. In this respect, when any of the sensors 22 determine that one or more of the batteries 30 is in a hazardous condition as part of step (104), the system may initially de-couple the affected battery from the bus interface 26 as part of the step for safely ejecting the one or more hazardous batteries from the electric flying vehicle 20''' midflight (106). At the same time, the battery compartment 28 housing the affected battery may unlock one or more ejection doors 54''' thereunder. Here, the ejection doors 54''' are integrated with the engine housings 38 as opposed to being integrated with the wings 36 (FIGS. 8-9) and/or being integrated with the fuselage 34 (FIGS. 6-7). As such, the unlocked battery compartment 28 housing the affected batteries may then be ejected from the engine housing 38 as part of step (108). This may occur by way of gravity or another ejection mechanism as disclosed herein, to more quickly move the battery compartment 28 out from within the engine housing 38 of the electric flying vehicle 20'''. As with the other embodiments disclosed herein, the next steps for deploying the parachute 50 coupled with the ejected battery compartment 28 as part of step (110) and safely landing the parachuted ejected battery compartment 28 on the ground as part of step (112), thereby ending the method (114), are similar to those disclosed above.

Additional aspects of the systems and methods for safely ejecting batteries from an electric aircraft midflight might include further integration of the sensor(s) 22, the communication line(s) 24, the bus interface(s) 26, and/or the central controller 29 with other systems onboard any of the electric flying vehicles 20, 20', 20", 20''' disclosed herein. For example, the systems and methods as disclosed herein could be integrated with a retractable landing gear system to ensure that a set of landing gear 58 (FIGS. 3 and 9) does not interfere with ejection of the damaged or hazardous batteries. Another example may be to integrate the central controller 29 with in-flight control software to mitigate the effects on flight dynamics when battery ejection occurs (e.g., a rapid and/or significant change to the weight and/or balance of the electric flying vehicle 20, 20', 20", 20''').

In other aspects of the embodiments disclosed herein, one or more of the batteries 30 and/or one or more of the battery compartments 28 retaining the one or more batteries 30 may be ejected forwardly or rearwardly, such as from one or more of the wings 36 and/or from one or more of the engine housings 38, may be ejected laterally from one or more sides of the fuselage 34, and/or may be ejected vertically by an ejection system akin to that of an ejection seat or ejector seat, depending on the flight dynamics at the time the batteries are ejected from the electric flying vehicle.

More specifically with respect to lateral ejection, the electric flying vehicle may include one or more ejection hatches formed laterally therein. Here, the ejection hatches may operate similar to the rear cargo door 46 and/or any of the ejection doors 54, 54', 54", namely pivoting or rotating from a normal closed position to an emergency open position whereby one or more of the batteries 30 and/or one or more of the battery compartments 28 retaining one or more damaged or hazardous batteries may be safely laterally ejected from the electric flying vehicle. In this embodiment, the ejection rails 40 may be reoriented 90 degrees, e.g., so any unlocked battery compartments will have a propensity to slide laterally toward and out the ejection hatches during an emergency. As with other embodiments disclosed herein, propellants and/or controlled explosives may aid in moving the respective battery compartment and/or batteries laterally for roll out or push out ejection through the side-accessible ejection hatches. Although, of course, other mechanisms disclosed herein, such as springs or mechanical apparatus (e.g., armatures operated by hydraulics), may be used to more quickly eject the battery compartment and/or batteries from the electric flying vehicle by way of the ejection hatches.

For vertical ejection, one or more panels of the body 32 may pivot open, pop open, or otherwise dislodge therefrom to provide an access opening to the fuselage 34 for purposes of vertical ejection of one or more of the batteries 30 and/or one or more of the battery compartments 28 retaining the one or more batteries 30 from the electric flying vehicle. Again, propellants, controlled explosives, springs, mechanical apparatus (e.g., armatures operated by hydraulics), and/or other mechanisms that may aid ejection as disclosed herein, may quickly and efficiently pop up and eject the damaged or hazardous battery out from the electric flying vehicle 20 through the now open panel in the body 32.

Although several embodiments have been described in detail for purposes of illustration, various modifications may be made without departing from the scope and spirit of the invention. Accordingly, the invention is not to be limited, except as by the appended claims.

What is claimed is:

1. A battery ejection system for an electric flying vehicle, comprising:
   an electric flying vehicle comprising a housing;
   the housing having one or more battery compartments coupled to a set of ejection rails, each of the battery compartments containing one or more batteries that provide power to the electric flying vehicle;
   a set of upstanding vertical guide rails generally positioned to constrain forward, rearward, and side-to-side movement of each battery compartment within the electric flying vehicle;
   a sensor for monitoring an operating state of each of the one or more batteries within the housing;
   wherein the vertical guide rails are upstanding from a base of the housing;
   wherein the housing can be a fuselage, a wing, or an external chamber;
   a controller in communication with the sensor for determining when the operating state of at least one of the one or more batteries is as a hazardous battery posing a safety risk to the electric flying vehicle, based on information received from the sensor; and
   an actuator opening enough of the housing to permit ejection of the hazardous battery out from within the electric flying vehicle midflight.

2. The system of claim 1, wherein the controller couples to the sensor and a bus interface connected to at least one of the one or more batteries, about a wired communication line.

3. The system of claim 1, including a lock retaining each of the battery compartments to the set of ejection rails, thereby reducing relative movement of the one or more batteries within the housing during a flight.

4. The system of claim 1, including a parachute, a speed brake, or a decelerator coupled to the battery compartment and positioned to deploy after the battery compartment ejects out from within the electric flying vehicle.

5. The system of claim 1, including a rear cargo door, a side hatch, or a bottom-mounted ejection door formed from a portion of the fuselage, each having a size and shape to permit select ejection of the hazardous battery out from within the electric flying vehicle.

6. The system of claim 1, wherein the sensor comprises a smoke sensor, a fire sensor, a light sensor, a heat sensor, or a stress-strain sensor.

7. The system of claim 1, including an accelerator comprising a spring, a propellant, a controlled explosive, or a hydraulic armature coupled to each of the one or more batteries to more quickly eject the hazardous battery out from within the electric flying vehicle.

8. The system of claim 1, including a parachute coupled with the ejected hazardous battery and including a telemetry transceiver.

* * * * *